US012405599B2

(12) United States Patent
Colyer et al.

(10) Patent No.: US 12,405,599 B2
(45) Date of Patent: Sep. 2, 2025

(54) SYSTEMS AND METHODS FOR MAINTAINING A RECORD FOR A WORKPIECE PROCESSED BY A COMPUTER NUMERICALLY CONTROLLED (CNC) ELECTRONICALLY SYNCHRONIZED MANUFACTURING ASSEMBLY LINE CELL

(71) Applicant: ATS CORPORATION, Cambridge (CA)

(72) Inventors: Chad William Colyer, Cambridge (CA); Robert David Almas, Cambridge (CA); Philip David Munroe, Cambridge (CA); James Mark Mclean, Cambridge (CA); Connor Hugh McIntosh Murray, Cambridge (CA); Hang Tran, Cambridge (CA); Kenneth Wayne Nicholson, Cambridge (CA)

(73) Assignee: ATS CORPORATION, Cambridge (CA)

( * ) Notice: Subject to any disclaimer, the term of this patent is extended or adjusted under 35 U.S.C. 154(b) by 0 days.

(21) Appl. No.: 18/777,181

(22) Filed: Jul. 18, 2024

(65) Prior Publication Data
US 2024/0369996 A1 Nov. 7, 2024

Related U.S. Application Data

(63) Continuation of application No. PCT/CA2024/050373, filed on Mar. 26, 2024.
(Continued)

(51) Int. Cl.
G05B 19/418 (2006.01)
G05B 19/4063 (2006.01)
G05B 19/414 (2006.01)

(52) U.S. Cl.
CPC ..... *G05B 19/4183* (2013.01); *G05B 19/4063* (2013.01); *G05B 19/4145* (2013.01)

(58) Field of Classification Search
None
See application file for complete search history.

(56) References Cited

U.S. PATENT DOCUMENTS 4,835,730 A * 5/1989 Shimano ............... B25J 9/1661
700/247
5,050,088 A * 9/1991 Buckler ........... G05B 19/41835
700/96

(Continued)

FOREIGN PATENT DOCUMENTS

WO 20160168785 A1 10/2016

OTHER PUBLICATIONS

Park, Hong-Seok, and Ngoc-Hien Tran. "Development of a smart machining system using self-optimizing control." The International Journal of Advanced Manufacturing Technology 74 (2014): 1365-1380. (Year: 2014).*

(Continued)

Primary Examiner — Carlos R Ortiz Rodriguez

(57) ABSTRACT

Various systems and methods for maintaining a record for a workpiece processed by a CNC electronically synchronized cell of a manufacturing assembly line are disclosed herein. Example embodiments involve a cell controller and a part-processing control system. The cell controller can be configured to: initialize a cell controller record; initiate a part assembly task involving at least one electronically synchronized part-processing operation and upon completion of each operation, update an inspection identifier of the cell controller. The part-processing control system can be configured to initialize a part-processing control system record; during completion of the part assembly task, query the cell controller for the inspection identifier, and update the part- (Continued)

processing control system record, based on a result of the querying; and upon completion of the part assembly task, compare the cell controller record and the part-processing control system record; and determine a status for the workpiece based on the comparison.

38 Claims, 7 Drawing Sheets

Related U.S. Application Data

(60) Provisional application No. 63/492,969, filed on Mar. 29, 2023.

(56) References Cited

U.S. PATENT DOCUMENTS

| | | | | |
|---|---|---|---|---|
| 5,509,191 A * | 4/1996 | Best | ............... | B23Q 7/1494 |
| | | | | 29/799 |
| 6,161,054 A * | 12/2000 | Rosenthal | ............... | C23C 16/52 |
| | | | | 414/217 |
| 6,640,151 B1 * | 10/2003 | Somekh | ............ | H01L 21/67253 |
| | | | | 700/121 |
| 6,748,287 B1 * | 6/2004 | Hagen | ............... | G06Q 10/06 |
| | | | | 700/95 |
| 6,763,130 B1 * | 7/2004 | Somekh | ............... | H01L 22/26 |
| | | | | 700/110 |
| 6,909,927 B2 * | 6/2005 | Nguyen | ............. | G05B 23/0272 |
| | | | | 700/110 |
| 6,965,895 B2 * | 11/2005 | Smith | ............... | G06F 16/2453 |
| | | | | 707/999.005 |
| 7,123,974 B1 * | 10/2006 | Hamilton | ............ | G05B 19/4063 |
| | | | | 700/86 |
| 7,421,307 B2 * | 9/2008 | Dolansky | ............. | G05B 19/128 |
| | | | | 700/86 |
| 7,665,661 B2 * | 2/2010 | Wang | ............... | H01L 23/544 |
| | | | | 235/385 |
| 9,292,811 B2 * | 3/2016 | O'Brien | ............... | G06Q 10/06 |
| 9,508,653 B2 * | 11/2016 | Zuo | ............... | H01L 21/6835 |
| 10,395,957 B2 * | 8/2019 | Kaneko | ............... | H01L 21/67276 |
| 2006/0106757 A1 | 5/2006 | Sakai et al. | | |
| 2016/0154912 A1 * | 6/2016 | Altare | ............... | G06F 30/18 |
| | | | | 703/13 |
| 2022/0019204 A1 | 1/2022 | Maury et al. | | |

OTHER PUBLICATIONS

Hsu, Hsien-Pin. "The development of a RFID and agent-based lot management controller for PROMIS in a client/server structure for IC assembly firm." Journal of Industrial and Production Engineering 32.8 (2015): 538-550. (Year: 2015).*

Liu, Wei, et al. "A method of NC machine tools intelligent monitoring system in smart factories." Robotics and computer-integrated manufacturing 61 (2020): 101842. (Year: 2020).*

International Search Report (ISR) & Written Opinion (WO) mailed Jun. 5, 2024 in PCT/CA2024/050373.

* cited by examiner

| Cell Controller | | | | | | |
|---|---|---|---|---|---|---|
| Time | Part ID | Station | Description | Operation | Inspection | Status |
| 0 | AECD2801XSDAA | 1A | Part present | Feed | WAIT INSPECT ID 0 RESULT - | Pass |
| 1 | AECD2801XSDAA | 1A | | Assemble | INSPECT INSPECT ID 1 RESULT PASS | Pass |
| 2 | AECD2801XSDAA | 2B | Part present | Assemble | INSPECT INSPECT ID 2 RESULT - | - |
| 3 | AECD2801XSDAA | 2B | | Load | INSPECT INSPECT ID 3 RESULT PASS | Pass |
| ... | | | | | | |
| 49 | AECD2801XSDAA | 1E | Part present | Assemble | INSPECT INSPECT ID 25 RESULT PASS | Pass |
| 50 | AECD2801XSDAA | | Receive status | | | Pass |

FIG. 5A   510a

| Part-Processing Control System | | | |
|---|---|---|---|
| Time | Part ID | Inspection ID | Status |
| 0 | 2801 | 0 | |
| 1 | 2801 | 1 | |
| 2 | 2801 | 2 | |
| 3 | 2801 | 3 | |
| ... | | | |
| 49 | 2801 | 25 | Pass |
| 50 | 2801 | 25 | |

| Cell Controller | | | | | | |
|---|---|---|---|---|---|---|
| Time | Part ID | Station | Description | Operation | Inspection | Status |
| 0 | ASFH1243ABCD | 1A | Part present | Feed | WAIT INSPECT ID 0 RESULT - | Pass |
| 1 | ASFH1243ABCD | 1A | | Assemble | INSPECT INSPECT ID 0 RESULT - | Pass |
| 2 | ASFH1243ABCD | 2B | Part present | Assemble | WAIT INSPECT ID 1 RESULT PASS | - |
| 3 | ASFH1243ABCD | 2B | | Load | INSPECT INSPECT ID 2 RESULT PASS | Pass |
| ... | | | | | | |
| 49 | ASFH1243ABCD | 1E | Part present | Assemble | INSPECT INSPECT ID 25 RESULT PASS | Pass |
| 50 | ASFH1243ABCD | | Receive status | | | Fail |

| Part-Processing Control System | | | |
|---|---|---|---|
| Time | Part ID | Inspection ID | Status |
| 0 | 1243 | 0 | |
| 1 | 1243 | 0 | |
| 2 | 1243 | 0 | |
| 3 | 1243 | 1 | |
| ... | | | |
| 49 | 1243 | 24 | Fail |
| 50 | 1243 | 24 | |

Cell Controller

| Time | Part ID | Station | Description | Operation | Inspection | Status |
|---|---|---|---|---|---|---|
| 0 | APEH7856XYZA | 1A | Part present | Feed | WAIT INSPECT ID 0 RESULT - | Pass |
| 1 | APEH7856XYZA | 1A | | Assemble | INSPECT INSPECT ID 1 RESULT FAIL | Fail <u>720</u> |
| 2 | APEH7856XYZA | 2B | Part present | Assemble | INSPECT INSPECT ID 2 RESULT - | - |
| 3 | APEH7856XYZA | 2B | | Load | INSPECT INSPECT ID 3 RESULT PASS | Pass |
| ... | | | | | | |
| 49 | APEH7856XYZA | 1E | Part present | Assemble | INSPECT INSPECT ID 25 RESULT PASS | Pass |
| 50 | APEH7856XYZA | | Receive status | | | Fail |

FIG. 7A 710a

Part-Processing Control System

| Time | Part ID | Inspection ID | Status |
|---|---|---|---|
| 0 | 7856 | 0 | |
| 1 | 7856 | 1 | |
| 2 | 7856 | 2 | |
| 3 | 7856 | 3 | |
| ... | | | |
| 49 | 7856 | 25 | Fail |
| 50 | 7856 | 25 | |

SYSTEMS AND METHODS FOR MAINTAINING A RECORD FOR A WORKPIECE PROCESSED BY A COMPUTER NUMERICALLY CONTROLLED (CNC) ELECTRONICALLY SYNCHRONIZED MANUFACTURING ASSEMBLY LINE CELL

CROSS-REFERENCE TO RELATED PATENT APPLICATION

The application is a continuation of PCT/CA2024/050373, filed on Mar. 26, 2024, which claims the benefit of U.S. Provisional Application No. 63/492,969, filed on Mar. 29, 2023. The complete disclosure of PCT/CA2024/050373 and U.S. Provisional Application No. 63/492,969 is incorporated herein by reference.

FIELD

The described embodiments relate to systems and methods for maintaining a record for a workpiece processed by a computer numerically controlled electronically synchronized cell of a manufacturing assembly line.

BACKGROUND

When a workpiece is processed by a production cell of a manufacturing assembly line, various operations executed on the workpiece can cause the workpiece to become unsuitable for its intended purpose(s). For example, a breakdown or malfunction of a device processing the workpiece can cause the workpiece to become defective. In an automated production station containing multiple part-processing devices processing a workpiece in multiple successive stages, a defect to a workpiece or a delay incurred at one stage of the process can be propagated through subsequent stages. Identifying defective workpieces and removing these workpieces or addressing the source(s) of the defect(s) and identifying faulted part-processing devices can help improve the later performance of the production cell, as well as offer a detailed audit trail of the manufacturing process of that workpiece.

SUMMARY

The various embodiments described herein generally relate to systems and methods for maintaining a record for a workpiece processed within a computer numerically controlled electronically synchronized cell during a manufacturing process.

In accordance with an example embodiment, there is provided a method for maintaining a record for a workpiece processed by a computer numerically controlled (CNC) electronically synchronized cell of a manufacturing assembly line. The method involves: initializing, at a cell controller, a cell controller record for the workpiece; initializing, at a part-processing control system, a part-processing control system record for the workpiece; initiating, at the cell controller, a part assembly task comprising at least one electronically synchronized part-processing operation; upon completion of each electronically synchronized part-processing operation of the at least one electronically synchronized part-processing operation, updating an inspection identifier of the cell controller record based on a result of the at least one part-processing operation; and during completion of the part assembly task, querying, at the part-processing control system, the cell controller for the inspection identifier and updating the part-processing control system record based on a result of the querying; upon completion of the part assembly task, comparing, at the part-processing control system the cell controller record and the part-processing control system record; and determining, at the part-processing control system, a status for the workpiece based on the comparison.

In some embodiments, the method further involves: determining, at the cell controller, a reference identifier for the workpiece; and transmitting, at the cell controller, a part identifier based on the reference identifier to the part-processing control system, and initializing the cell controller record involves initializing the cell controller record based on the reference identifier for the workpiece and initializing the part-processing control system record involves initializing the part-processing control system record based on the part identifier for the workpiece.

In some embodiments, the part identifier includes a portion of the reference identifier.

In some embodiments, initiating the part assembly task involves determining the part assembly task based on the reference identifier.

In some embodiments, the method further involves: notifying, at the part-processing control system, the cell controller of a presence of the workpiece in the cell; transmitting, at the cell controller, instructions to an identification device in communication with the cell controller for identifying the workpiece; and determining the reference identifier based on a result of the identification device.

In some embodiments, updating the cell controller record involves incrementing an inspection identifier of the cell controller record and updating the part-processing control system record involves incrementing an inspection identifier of the part-processing control system record.

In some embodiments, querying at the part-processing control system, the cell controller for the inspection identifier involves querying the cell controller at an electronically timed time interval and determining the presence of the updated inspection identifier during the electronically timed time interval.

In some embodiments, the electronically timed time interval is based on the at least one electronically synchronized part-processing operation.

In some embodiments, the method further involves notifying, at the cell controller, of a presence of the updated inspection identifier to the part-processing control system.

In some embodiments, the method further involves transmitting, at the part-processing control system, the part-processing control system record of the workpiece to the cell controller; and merging, at the cell controller, the cell controller record and the part-processing control system record to obtain a merged cell controller record.

In some embodiments, the method further involves transmitting the merged cell controller record to a database.

In some embodiments, comparing the cell controller record and the part-processing control system record involves comparing the inspection identifier of the cell controller record and the inspection identifier of the part-processing control system.

In some embodiments, the part assembly task includes at least one loading operation and the method further involves: transmitting, by the part-processing control system, a request identifier associated with the workpiece, the request identifier comprising a pallet identifier and a nest identifier for the workpiece associated with a station within the cell;

and updating, at the cell controller, the cell controller record with a location identifier of the workpiece associated with the station.

In some embodiments, the method further involves: transmitting, to at least one part-processing device, process information for processing the workpiece based on the reference identifier and a location identifier for the workpiece; and processing, by the at least one part-processing device, the workpiece according to the process information.

In some embodiments, the method further involves: transmitting, at the part-processing control system, an inspection request to the cell controller, the inspection request comprising the part identifier for the workpiece; and determining, at the part-processing control system, an expected inspection identifier for the workpiece, and determining, at the part-processing control system, the status for the workpiece is based in part on the expected inspection identifier for the workpiece.

In some embodiments, the method further involves: receiving, by the cell controller, an inspection result for the workpiece from a part-processing device of the at least one part-processing device; updating, by the cell controller, the cell controller record for the workpiece with the inspection result; determining, by the cell controller, a status for the workpiece based on the inspection result; and updating the cell controller record with at least one of the inspection result and the status for the workpiece.

In some embodiments, determining the status for the workpiece involves evaluating the inspection result based on process tolerances.

In some embodiments, the process tolerances are based on at least one the reference identifier for the workpiece and the part-processing device.

In some embodiments, the status of the workpiece is one of a pass or a fail.

In accordance with an embodiment, there is provided a system for maintaining a record for a workpiece processed by a computer numerically controlled (CNC) electronically synchronized cell of a manufacturing assembly line. The system includes: a cell controller configured to: initialize a cell controller record for the workpiece; initiate a part assembly task comprising at least one electronically synchronized part-processing operation; and upon completion of each electronically synchronized part-processing operation of the at least one electronically part-processing operation, update an inspection identifier of the cell controller record based on a result of the at least one electronically synchronized part-processing operation; and the part-processing control system electronically synchronized with the cell controller, configured to: initialize a part-processing control system record for the workpiece; during completion of the part assembly task, query the cell controller for the inspection identifier and update the part-processing control system record, based on a result of the querying; upon completion of the part assembly task, compare the cell controller record and the part-processing control system record; and determine a status for the workpiece based on the comparison.

In some embodiments, the cell controller is further configured to: determine a reference identifier for the workpiece; transmit a part identifier based on the reference identifier to the part-processing control system; and initialize the cell controller record based on the reference identifier for the workpiece, and the part-processing control system is further configured to initialize the part-processing control system record based on the part identifier for the workpiece.

In some embodiments, the part identifier includes a portion of the reference identifier.

In some embodiments, initiating the part assembly task involves determining the part assembly task based on the reference identifier.

In some embodiments, the part-processing control system is configured to notify the cell controller of a presence of the workpiece in the cell; and the cell controller is configured to: transmit instructions to an identification device in communication with the cell controller for identifying the workpiece; and determine the reference identifier based on a result of the identification device.

In some embodiments, updating the cell controller record involves incrementing an inspection identifier of the cell controller record and updating the part-processing control system record involves incrementing an inspection identifier of the part-processing control system record.

In some embodiments, the part-processing control system is configured to: query the cell controller at an electronically timed time interval; and determine the presence of the updated inspection identifier during the electronically timed time interval.

In some embodiments, the electronically timed time interval is based on the at least one electronically synchronized part-processing operation.

In some embodiments, the cell controller is configured to notify the part-processing control system of a presence of the updated inspection identifier.

In some embodiments, the part-processing control system is further configured to transmit the part-processing control system record of the workpiece to the cell controller; and the cell controller is configured to merge the cell controller record and the part-processing control system record to obtain a merged cell controller record.

In some embodiments, the cell controller is further configured to transmit the merged cell controller record to a database.

In some embodiments, the part-processing control system is further configured to compare the inspection identifier of the cell controller record and the inspection identifier of the part-processing control system.

In some embodiments, the part assembly task includes at least one loading operation and the part-processing control system is configured to transmit a request identifier associated with the workpiece, the request identifier including a pallet identifier and a nest identifier for the workpiece associated with a station within the cell; and the cell controller is configured to update the cell controller record with a location identifier of the workpiece associated with the station.

In some embodiments, the part-processing control system is configured to transmit process information for processing the workpiece based on the reference identifier and a location identifier for the workpiece; and process by the at least one part-processing device, the workpiece according to the process information.

In some embodiments, the part processing control system is configured to: transmit an inspection request to the cell controller, the inspection request including the part identifier for the workpiece; and determine an expected inspection identifier for the workpiece, and determining the status for the workpiece is based in part on the expected inspection identifier for the workpiece.

In some embodiments, the cell controller is configured to: receive an inspection result for the workpiece from a part-processing device of the at least one part-processing device; update the cell controller record for the workpiece with the inspection result; determine a status for the workpiece based on the inspection result; and update the cell controller record with at least one of the inspection result and the status for the workpiece.

In some embodiments, determining the status for the workpiece involves evaluating the inspection result based on process tolerances.

In some embodiments, the process tolerances are based on at least one the reference identifier for the workpiece and the part-processing device.

In some embodiments, the status of the workpiece is one of a pass or a fail.

BRIEF DESCRIPTION OF THE DRAWINGS

Several embodiments will be described in detail with reference to the drawings, in which:

FIG. 5A is an example cell controller record maintained by the cell controller disclosed herein, in accordance with an example embodiment;

FIG. 5B is an example part-processing control system record maintained by the part-processing control system disclosed herein, in accordance with an example embodiment;

FIG. 6A is another example cell controller record maintained by the cell controller disclosed herein, in accordance with an example embodiment;

FIG. 6B is another example part-processing control system record maintained by the part-processing control system disclosed herein, in accordance with an example embodiment;

FIG. 7A is another example cell controller record maintained by the cell controller disclosed herein, in accordance with an example embodiment; and FIG. 7B is another example part-processing control system record maintained by the part-processing control system disclosed herein, in accordance with an example embodiment.

Figure 1:
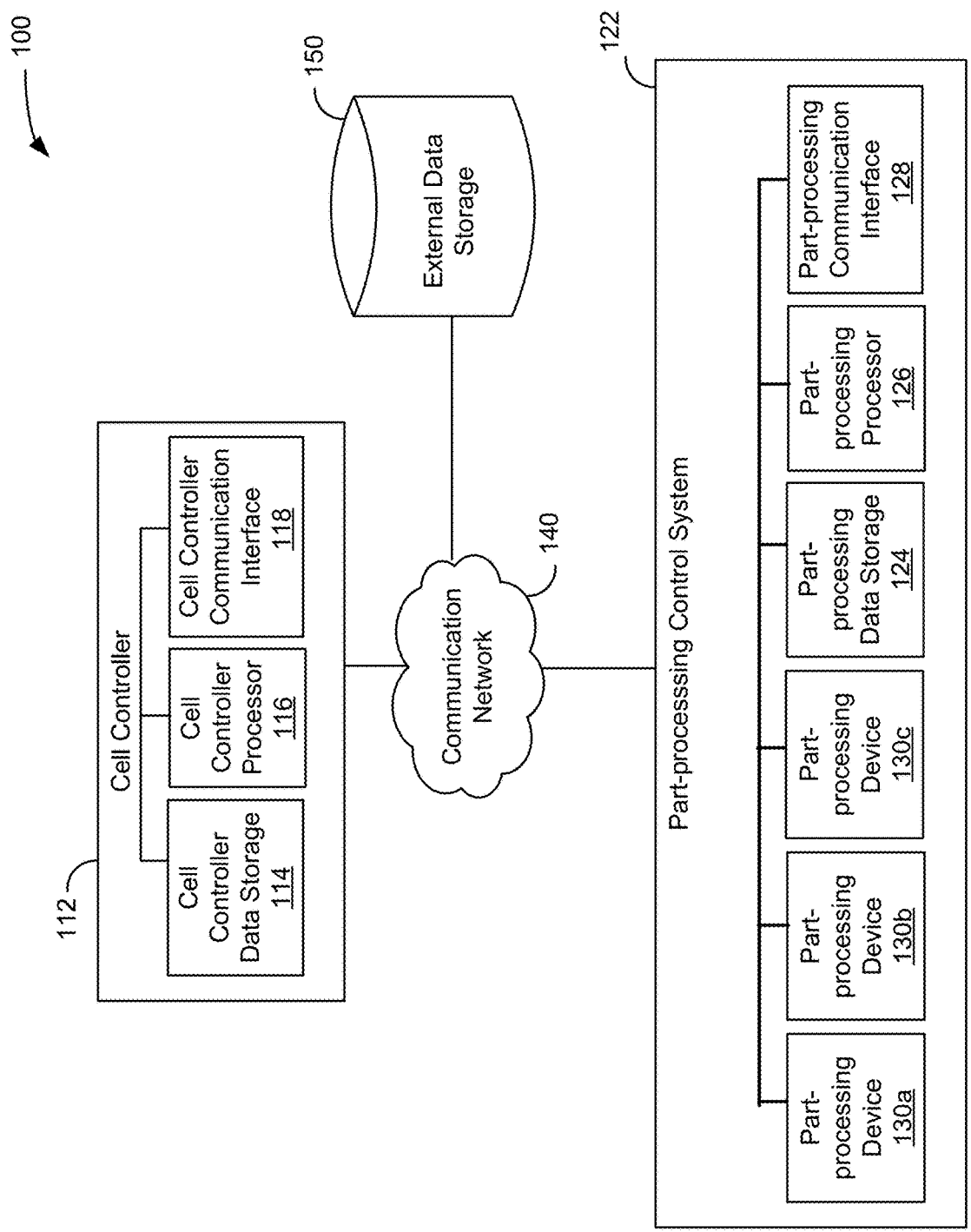
FIG. 1 is a block diagram of an example computer numerically controlled electronically (CNC) synchronized manufacturing assembly line system, in accordance with an example embodiment.

The drawings, described below, are provided for purposes of illustration, and not of limitation, of the aspects and features of various examples of embodiments described herein. For simplicity and clarity of illustration, elements shown in the drawings have not necessarily been drawn to scale. The dimensions of some of the elements may be exaggerated relative to other elements for clarity. It will be appreciated that for simplicity and clarity of illustration, where considered appropriate, reference numerals may be repeated among the drawings to indicate corresponding or analogous elements or steps.

DESCRIPTION OF EXAMPLE EMBODIMENTS

A manufacturing process can involve processing parts to produce a product. During the manufacturing process, the part requiring further processing (for example, a subcomponent or partially finished product) can be referred to as a workpiece. The workpiece can be moved through a production station (e.g., a cell) among various part-processing devices that perform the various operations on the workpiece(s) in production of the product. In some examples, such production processes can utilize a large number of multi-purpose, re-configurable machines for performing specific operations on the workpiece(s) in production of the product.

When a workpiece is processed by a cell, for example, during a manufacturing process, multiple operations and tests may be performed on the workpiece. Maintaining a record of the operations and tests can allow the processes performed by the cell to be subsequently audited and analyzed, and for issues to be detected.

In some cases, for example, one or more part-processing devices may experience fault(s) that may cause a workpiece to become defective or cause a delay in production that may affect the overall production process. Identifying workpieces that may be defective can limit the impact of the defective workpieces on the manufacturing process, improve the quality of the products produced and help identify part-processing devices that may be responsible for the defect.

The systems and methods disclosed herein can maintain a record for a workpiece being processed by a computer numerically controlled (CNC) electronically synchronized cell. Maintaining a record for a workpiece can allow decisions to be made about workpieces such that the production process can operate in a fail-safe manner.

Maintaining a record for a workpiece can involve communicating information, including inspection information, about the workpiece between a cell controller configured to oversee the processing of the workpiece, manage data related to the workpiece and interface with the various part-processing devices within the production cell and a part-processing control system configured to manage individual processes associated with the workpiece for example, motion control. The communication between the cell controller and the part-processing control system can occur at electronically timed time windows and the part-processing control system can be computer numerically controlled through electronic camming.

Inspection information can include inspection results obtained from device(s) configured to perform inspection operations and to transmit the results of these inspection operations to the cell controller. Inspection can allow workpieces that may be defective to be failed and if needed, subsequently discarded.

As will be described in further detail, the cell controller and the part-processing control system can maintain separate records for the workpiece. The cell controller can maintain a detailed record for the workpiece, which can include, for example, data about operations to be performed on the workpiece, operational data for the part-processing devices processing the workpiece, identification information for the workpiece, workpiece inspection results and/or processed inspection results, while the part-processing control system can maintain simple record(s), for example record(s) that contains only the information necessary to identify the workpiece and record inspection results. Each of the records can be updated during a part assembly task and the records may be compared at the end of the part assembly task to determine a status for the workpiece. By comparing the cell controller record and the part-processing control system records, the part-processing control system can determine information about the workpiece that was not obtained during the part assembly task, without requiring the part-processing control system to inspect workpieces or consider the state of each operation while the workpieces are processed, which can allow the resources of the part-processing control system to be dedicated to processing the workpieces.

The status of the workpiece and the records for the workpiece may be transmitted to an external database or an external fault management system for further analysis. For example, the records can be stored for auditing purposes.

Reference is first made to FIG. 1, which shows a block diagram of an example computer numerically controlled electronically synchronized manufacturing assembly line system 100, in accordance with an example embodiment. The computer numerically controlled electronically synchronized manufacturing assembly line system 100 includes a cell controller 112, a part-processing control system 122 and an external data storage 150 in communication via a communication network 140.

The cell controller 112 can be configured to oversee the processing of workpieces by for example, transmitting and receiving data related to the part-processing devices processing the workpieces, and manage data related to the workpieces. By contrast, the part-processing control system 122 can be a specialized system configured to manage individual processes associated with the workpiece for example, motion control. Resources associated with the cell controller can be allocated to prioritize managing data, while resources associated with the part-processing control system 122 may be allocated to prioritize rapid processing of workpieces.

The manufacturing assembly line system 100 may comprise a numerically synchronized control architecture (i.e., coordinated through electronic camming programming). Accordingly, movements of components such as workpieces may occur along programmable axes of motion, which can be either rotary or linear and communications between the cell controller 112 and the part-processing control system(s) 122 and in some cases, the part-processing devices 130 may also be electronically synchronized.

The cell controller 112 includes a cell controller data storage 114, a cell controller processor 116 and a communication interface 118. The cell controller can be implemented using a computing device, for example, a programmable logic controller (PLC).

The cell controller processor 116 may be implemented using any suitable processors, controllers, digital signal processors, graphics processing units, application specific integrated circuits (ASICs), field programmable gate arrays (FPGAs), microcontrollers, and/or other suitably programmed or programmable logic circuits that can provide sufficient processing power depending on the configuration, purposes and requirements of the cell and the type of computing device on which the cell controller 112 is implemented.

The cell controller processor 116 can control the operation of the part-processing devices 130 within the cell. The cell controller processor 116 can determine and select control parameters for the part-processing devices 130 to perform coordinated operations. The control parameters may be stored in the cell controller data storage 114 and accessed when the workpiece is processed.

The cell controller data storage 114 can store information about the part-processing devices 130, including operating data, profile data (e.g., servo-motor profile data), motion data with which the part-processing devices 130 operate (e.g., tool motion data), data in respect of products that the automated production station can produce, data in respect of parts or workpieces that may be used to produce the products.

The cell controller data storage 114 can store a cell controller record, or multiple cell controller records, for example, one for each type of workpiece or each workpiece that may be processed within the cell. The cell controller record may be a dynamic and detailed record that can be populated with data about a workpiece as the workpiece processes through the cell (e.g., a serial number associated with the workpiece, a location of the workpiece, inspection results, status of the workpiece, etc.). The cell controller record may also contain a reference identifier for the workpiece and an associated part identifier for the workpiece that may be transmitted to the part-processing control system 122, control parameters, and/or process information for instructing the part-processing devices 130 to perform operations, process tolerances for the various processes to be performed on a workpiece, and any other information that may be useful for processing the workpiece as shown in FIGS. 5A, 6A and 7A which show example cell controller records. While FIGS. 5A, 6A and 7A show cell controller records including a part ID, a station number, a description, an operation, an inspection and a status field, it will be understood that the cell controller record can include additional fields of information, as described, which have been omitted for ease of illustration.

The cell controller communication interface 118 may include a local communication interface for communicating with components of the part-processing control system 122, for example, the part-processing processor 126 and in some cases, the part-processing device 130, for example, via built-in ports. In some cases, the cell controller communication interface 118 may also be equipped with a wireless communication interface to enable wireless communications between the cell controller 112 and the communication network 140.

The part-processing control system 122 includes a part-processing data storage 124, a part-processing processor 126 and a part-processing communication interface 128. While only one part-processing processor 126 is shown, the part-processing control system 122 can include more than one part-processing processor 126. For example, a cell may contain one or more substations and each substation may be associated with a part-processing processor 126. In such cases, each substation part-processing processor 126 may additionally be in communication with a part-processing processor for the cell, that may collect data from each of the substation part-processing processors 126. The cell controller 112 and the part-processing control system 122 can be in communication via the communication interfaces 118 and 128.

The part-processing processor 126 may be implemented using any suitable processors, controllers, digital signal processors, graphics processing units, application specific integrated circuits (ASICs), field programmable gate arrays (FPGAs), microcontrollers, and/or other suitably programmed or programmable logic circuits that can provide sufficient processing power depending on the configuration, purposes and requirements of the part-processing control system 122 and that is compatible with the type of computing device on which the part-processing processor 126 is implemented. For example, the part-processing processor 126 may reside on a computing device, for example, a PLC.

The part-processing data storage 124 can store a part-processing control system record for each workpiece that may record data collected about the workpiece while the workpiece is being processed within the cell or a substation of a cell. For example, the part-processing processor(s) 126 may access the part-processing control system record to update the record associated with the workpiece as the workpiece is processed by the cell. The part-processing control system record may generally include less information than the cell controller record and may generally include information that is less detailed than the information contained in the cell controller record. The part-processing control system record can for example, include only the necessary information for tracking the workpiece and for indicating the status of the workpiece. For example, the part-processing control system record may comprise information about a status of a workpiece and in some cases information about the location of a workpiece but may not comprise operational data for the part-processing devices 130, as shown in FIGS. 5B, 6B and 7B. The part-processing control system 122 may be electronically synchronized such that it may collect information and update the part-processing control system record at electronically timed time windows.

The part-processing devices 130 can be configured to process a workpiece and can include tooling components for processing the workpiece. In some embodiments, one or more part-processing devices 130 can be inspection device(s) configured to inspect a workpiece following completion of a part-processing operation. For example, one or more part-processing devices 130 can be identification device(s) configured to detect workpieces within a detection range and/or generate identification data for the workpieces.

Each part-processing device 130 can include one or more processors for facilitating the operation of the part-processing device, a storage component for storing data to be used during operation of the part-processing device, for example, operational data or software applications executable by the processor(s) and a communication component for communicating with the cell controller 112.

Although three part-processing devices 130a, 130b, and 130c are shown in FIG. 1, part-processing control system 122 can include more, or fewer part-processing devices 130, depending on the manufacturing assembly line system.

The communication network 106 can include one or more networks, for example, a local area network and a wide area network. The local network can allow the cell controller 112 and the part-processing control system 122 to communicate. For example, the cell controller 112 and the part-processing control system 122 can be in communication via an Ethernet IP/Discrete I/O connection or a Profinet/Discreet I/O connection. The communication network 106 can also include any type of network capable of carrying data, including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. Wi-Fi, WiMAX), SS7 signaling network, fixed line, local area network, wide area network, and others, including any combination of these, capable of interfacing with, the cell controller 112, the part-processing control system 122 or components of the part-processing control system 122 including the part-processing devices 130, and the external storage component 150. For example, the cell controller 112 of the part-processing devices 130 of the part-processing control system 122 to transmit and/or receive operational data. The cell controller 112 may communicate with the external data storage 150 to, for example, transmit records.

The external storage component 150 can store information similar to the cell controller data storage 114, including information about the part-processing devices 130, including operating data, profile data (e.g., servo-motor profile data), motion data with which the part-processing devices 110 operate (e.g., tool motion data), measurement data, data in respect of products that the automated production station can produce and/or data in respect of parts or workpieces that may be used to produce the products.

Profile data, motion data, product data, part data, and workpiece data can be stored in system storage component 150 for subsequent retrieval by the part-processing devices 130. The part-processing devices 130 can download motion data, product data, part data, and workpiece data from the external storage component 150 via the communication network 140, for example.

Profile data and motion data can be generated for the part-processing devices 110. For example, tables representing the profile data and motion data of tools of the part-processing devices 130 can be imported and form the basis for the profile data and motion data, respectively. In another example, the cell controller 112 can generate the motion data based on data collected by the part-processing device 130.

The external data storage 150 can store data from the cell controller record and/or the part-processing control system record and/or a status for the workpiece. For example, data from the cell controller record and/or the part-processing control system record associated with a workpiece may be transmitted to the external data storage 150 when the workpiece exits the cell. The data can be stored and retrieved at a later time for further analysis or can be transmitted to an external fault management system for record-keeping purposes, to provide an audit trail, or for further analysis.

Figure 2:
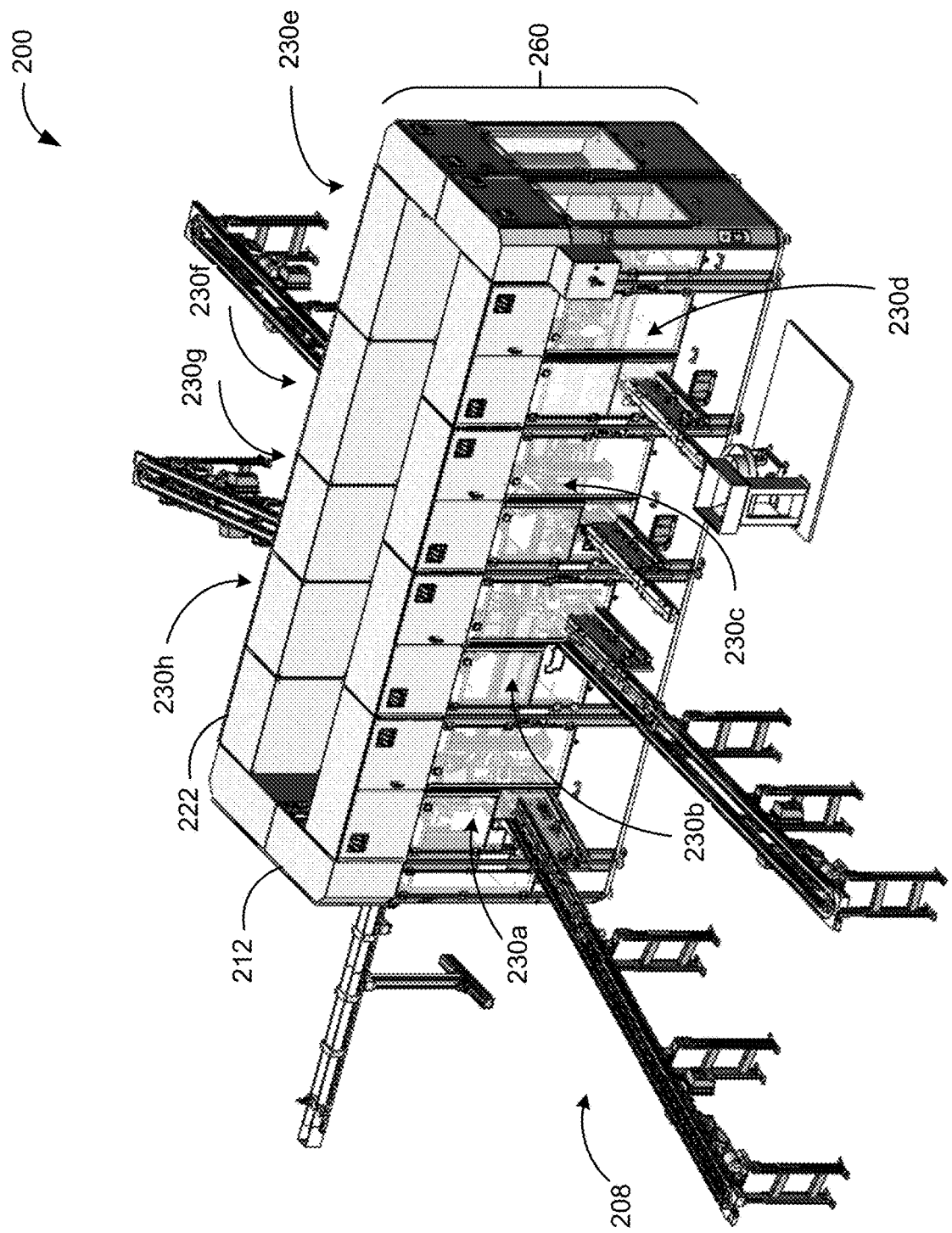
FIG. 2 is a perspective view of an example manufacturing assembly line system of FIG. 1.

Reference is now made to FIG. 2, which shows example manufacturing assembly line system 200 in which workpieces may be processed. The production station 200 can correspond to a cell and includes a cell controller 212 and a part-processing control system 222. The production station 220 can include multiple substations, and in some cases, each substation may be associated with a different part-processing control system 222. The manufacturing assembly line system 200 also includes one or more part-processing devices 210, a station power system 260, and one or more tracks 208. The manufacturing assembly line system 200 can be a CNC station.

The manufacturing assembly line system 200 can be any type of manufacturing assembly line system in which workpieces are processed. For example, the manufacturing assembly line system 200 can be configured to manufacture food or beverage, textile, computer or electronic, vehicle, chemical, pharmaceutical, medical, cosmetic, or other products. The manufacturing assembly line system 200 can perform discrete manufacturing processes to produce discrete products or perform process manufacturing processes to produce bulk or undifferentiated products. The particular arrangement and configuration of the manufacturing assembly line system 200 can depend on the type of the product being manufactured.

The cell controller 212 is an example of the cell controller 112. Station power system 260 can provide a common electrical power supply for the part-processing devices 230a-230h, the part-processing control system 222, the one or more tracks 208, and cell controller 212. Station power system 260 can include but is not limited to power supplies, converters, inverters, and energy storage components.

Each of the one or more part-processing devices 230 is an example of a part-processing device 130. The part-processing devices 230 can be configured to perform a specific processing task on a workpiece. For example, the one or more part-processing devices 230 can include one or more workpiece transfer devices that transfers the workpieces from one part-processing device to another. The one or more part-processing devices 230 can also include one or more devices configured for inspecting the workpieces upon completion of a part-processing operation.

During operation of the manufacturing assembly line system 200, a workpiece can travel among the part-processing devices 230. For example, a workpiece can travel from a part-processing device, such as part-processing device 130a, to a downstream part-processing device, such as part-processing device 130b. Each part-processing device 230 can progressively process the workpiece until a product is complete. At each stage of the processing, the cell controller 212 and the part-processing control system(s) 222 may communicate with each other, such that a status for the workpiece can be determined.

In some embodiments, the manufacturing assembly line system 200 can include one or more tracks 208 extending from the production station 200 for transporting workpieces. Each of the one or more tracks 208 can include a conveyor. In some embodiments, a track 208 can be configured as an out-feed track to transport workpieces or products from the manufacturing assembly line system 200. Products may be transported out of the manufacturing assembly line system 400 after completion. For example, workpieces with a "pass" status may be transported out of the manufacturing assembly line system 200 after completion. Workpieces with a "fail" status may be transported out of the manufacturing assembly line system 200 to be discarded.

Figure 3:
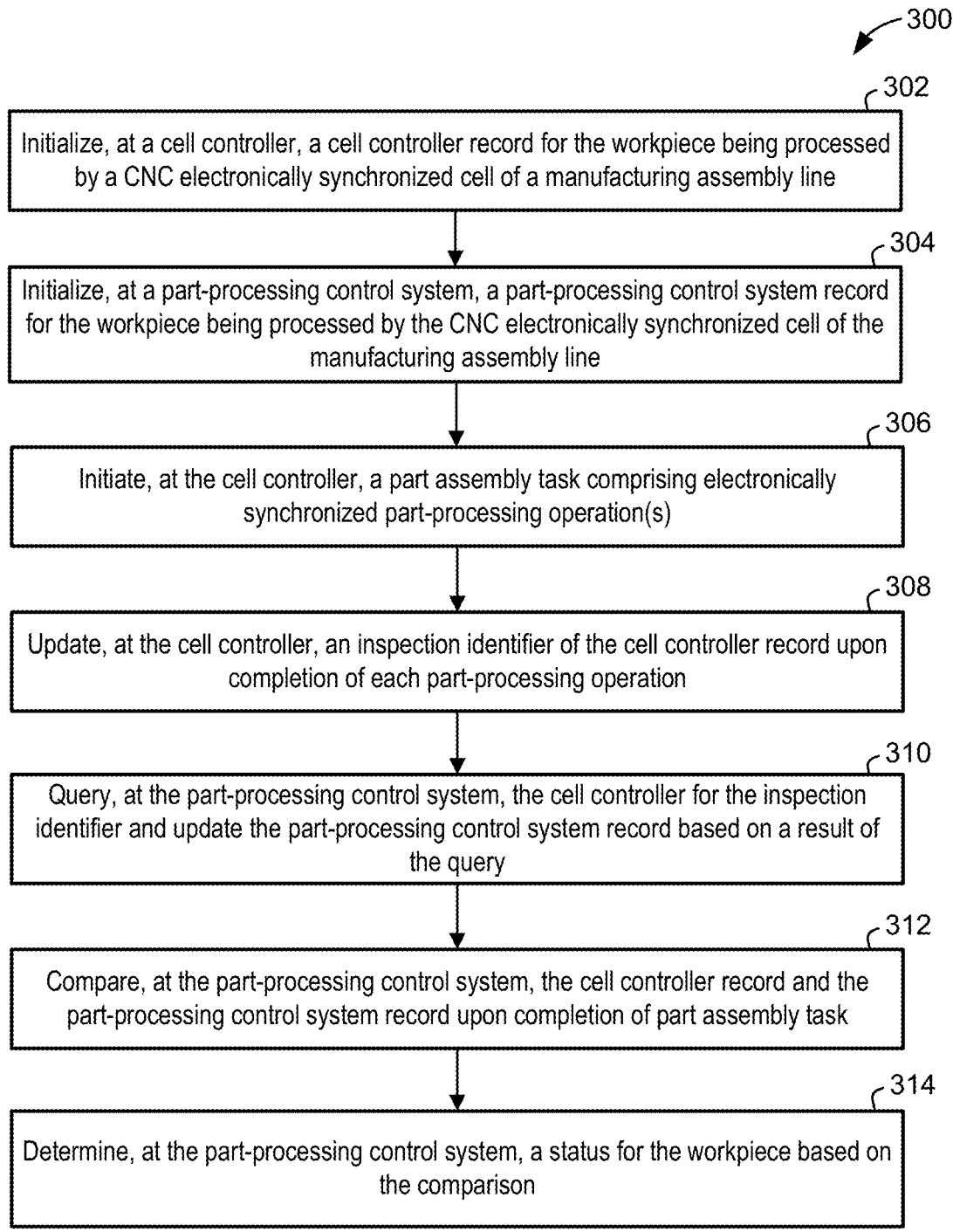
FIG. 3 is a flowchart of an example method for maintaining a record for a workpiece processed by a computer numerically controlled electronically synchronized manufacturing assembly line system, in accordance with an example embodiment.

Reference is now made to FIG. 3, which shows a flowchart of an example an example method 300 for maintaining a record for a workpiece processed by a computer numerically controlled electronically synchronized manufacturing assembly line system, in accordance with an example embodiment.

At 302, the cell controller processor 116 initializes a cell controller record for the workpiece. For example, the cell controller processor 116 can retrieve an existing record associated with a workpiece of the type corresponding to the workpiece from the data storage 114 and initialize the record to prepare the cell controller 112 for receiving information about the workpiece. The cell controller record can be pre-populated or populated with information for processing the workpiece, including process information that may be transmitted to the part-processing devices 130.

At 304, the part-processing processor 126 initializes a part-processing control system record for the workpiece. For example, the part-processing processor 126 can associate a record with an identifier for the workpiece. The record may be stored in the data storage 124.

In some embodiments, the cell controller processor 116 can determine a reference identifier for the workpiece and initialize the cell controller record based on the reference identifier. For example, an entry of the cell controller record may be initialized with the reference identifier. The cell controller processor 116 can transmit a part identifier based on the reference identifier to the part-processing control system 122 and the part-processing control system record can be initialized with the part identifier received from the cell controller 112. The part identifier may be a simplified version of the reference identifier, for example, the part identifier may contain or correspond to a portion of the reference identifier. For example, referring briefly to FIGS. 5A-5B, which show example records for a workpiece, the reference identifier ("PartID") used by the cell controller 112 for a workpiece may be a detailed identifier as shown in FIG. 5A, while part identifier ("PartID)") used by the part-processing control system 122 may be a simplified version of the reference identifier, as shown in FIG. 5B. The reference identifier and the part identifier may be used by the cell controller 112 and the part-processing control system 122, respectively, to identify the workpiece as the workpiece progresses through the manufacturing process.

In some embodiments, when the workpiece is received at the cell, the part-processing processor 126 may determine that the workpiece is present within the cell and notify the cell controller 112 of the presence of the workpiece. For example, the part-processing processor 126 can be in communication with a part detection device that can signal to the part-processing processor 126 that a workpiece is present. The cell controller processor 116 can transmit instructions to an identification device to identify the workpiece. The identification device can be any device that can detect that a workpiece has entered the cell and/or identify workpieces and generate identification data for the workpieces. For example, the identification device be an optical scanner such as a barcode reader that can identify the workpiece based on physical markings on the workpiece, such as a barcode. In such embodiments, the reference identifier can be determined based on the identification received by the identification device.

At 306, the cell controller processor 116 initiates a part assembly task for the workpiece to process the workpiece. The part assembly task can consist of at least one electronically synchronized part-processing operation.

The cell controller processor 116 can determine the part assembly task based on the reference identifier for the workpiece. For example, different workpieces can be associated with different part assembly tasks. The cell controller processor 116 can transmit process information for processing the workpiece to part-processing device(s) 130 configured for processing the workpiece according to the process information via the communication network 140. The process information can include information about the workpiece (e.g., part type, reference identifier, serial number), instructions for processing the workpiece and any other information required for the part-processing device(s) 130 to process the workpiece. To determine the process information to be transmitted, the cell controller processor 116 can reference the data storage 114.

The part assembly task may be a "pick-and-place" operation that involves moving the workpiece from one station to another within the cell. In such cases, the part-processing processor 126 can transmit a request identifier for the workpiece, which can include a pallet identifier and nest identifier indicating a station within the cell. The part-processing processor 126 can transmit to the cell controller 112 the station information and the cell controller processor 116 can update the cell controller record with a location identifier associated with the station, such that the cell controller processor 116 can track the location of the workpiece. In some cases, the location identifier can be a serial number, which may be stored in the cell controller record, for example, in a location field of the cell controller record.

At 308, upon completion of each electronically synchronized part-processing operation, the cell controller processor 116 updates an inspection identifier of the cell controller record based on a result of the part-processing operation. The inspection identifier can correspond to a field in the cell controller record.

Updating the inspection identifier of the cell controller record can involve incrementing the inspection identifier field in the cell controller record. Incrementing the inspection identifier can for example, indicate completion of the part-processing operation and/or indicate completion of an inspection operation on the workpiece following the part-processing operation.

For example, the cell controller processor 116 can receive an inspection result from an inspection device. The inspection device may be electronically synchronized with the cell controller 112 such that inspection results may be received during predetermined time windows. The inspection device may be the device processing the workpiece (i.e., the part-processing device 130) during a part processing operation or may be a separate device configured to conduct inspection, checks or tests of workpieces upon completion of part-processing operations. In some cases, the part-processing processor 126 can transmit a signal to the cell controller 112 to interact with the inspection device to obtain an inspection result. The transmission of the signal can be electronically timed. In other cases, the part-processing processor 126 may transmit a signal to the cell controller 112 to prepare for inspection, transmit a signal to the inspection device to instruct the inspection device to perform the inspection operation. The inspection result can then be transmitted to the cell controller 112, which has been prepared for inspection. Each of these steps may be electronically timed and one or more steps may occur during separate electronically timed time windows. Inspection results may be recorded in the cell controller record.

The inspection result can consist of an indication that the part-processing operation has been completed, an indication of whether the workpiece has passed inspection according to predetermined inspection criteria, and/or quantitative or qualitative results of the inspection operation. For example, in some cases, a faulted part-processing operation can cause the workpiece to become defective, and an inspection device may identify the fault and transmit this result to the cell controller 112. In some cases, an indication that the inspection device has performed the inspection operation can be transmitted to the cell controller 112 during a first electronically timed time window but the inspection results may not be transmitted until a later time, outside of the electronically timed time window, for example, when inspection results require significant processing. In such cases, when the part-processing processor 126 queries the cell controller 112 (as will be described below), the part-processing processor 126 may determine that the inspection identifier of the cell controller record has been updated but may not receive the assessment of the result until after completion of the part assembly task (as will be described below). The cell controller processor 116 can determine a status for the workpiece based on the inspection result and update the cell controller record with the status of the workpiece and/or the inspection result for the workpiece. For example, the cell controller processor 116 can determine that the workpiece should pass or should fail.

As shown in FIGS. 5A, 6A and 7A for example, the cell controller record can include an inspection identifier data field indicating that an inspection has occurred and an inspection result data field, storing the results of the inspection. For ease of illustration, the inspection results are shown as "PASS" or "FAIL" but it will be understood that the inspection results can include quantitative results, for example, measurements, images that can be processed for analysis, and/or other types of qualitative results. As shown, the status of the workpiece can be determined based on the inspection, for example based on an indication that the inspection has occurred and/or inspection results. Recording inspection results can allow a detailed record of the workpiece as it is processed to be created, for example, for auditing purposes. For example, by examining records of workpieces, it may be determined that specific processing step(s) or station(s) are not operating as expected.

In some cases, the cell controller processor 116 can determine the status for the workpiece by evaluating inspection results received from the part-processing device 130 based on process tolerances. The process tolerances can be based on the part-processing operation, the part-processing device 130 and/or the workpiece, as identified by the reference identifier. For example, different part-processing operations, devices or workpieces can tolerate different tolerances.

Process tolerances can be stored in the cell controller record and/or in the cell controller data storage 114 and be accessed by the cell controller processor 116.

At 310, during the part assembly task, the part-processing processor 126 queries the cell controller 112 for the inspection identifier and updates the part-processing control system record based on the result of the querying. For example, the part-processing processor 126 associated with the substation processing the workpiece may access the record associated with the workpiece and update the record to indicate that the cell controller record has been updated.

Updating the part-processing control system record can involve incrementing an inspection identifier field of the part-processing control system record.

The part-processing processor 126 can query the cell controller 112 at an electronically timed time window. For example, the part-processing processor 126 122 can query the cell controller 112 at a predetermined frequency. The electronically timed time window can be based on the part-processing operation(s) being completed.

When the cell controller record is updated prior to the part-processing processor 126 querying the cell controller 112, when the part-processing processor 126 queries the cell controller 112, the part-processing processor 126 may determine that an inspection has occurred and update the part-processing control system record to reflect that inspection has occurred. The cell controller record and the part-processing control system record being in agreement can indicate that no delays have occurred in processing the workpiece and accordingly, the processing of the workpiece is occurring as expected. As the cell can be a CNC electronically synchronized cell, when the cell is operating as expected, the timing of the part-processing processor 126 querying the cell controller 112 can be configured such that the part-processing processor 126 queries the cell controller 112 only when inspection is expected to have been performed.

As shown in FIGS. 5A-5B for example, during time window 1, the cell controller processor 116 increments the cell controller record inspection identifier in response to determining that inspection has occurred. When the part-processing processor 126 queries the cell controller record during the same time window, the part-processing processor 126 determines that the inspection identifier of the cell controller record has been updated, and updates the part-processing control system record, for example, by incrementing the inspection identifier field. The part-processing processor 126 and the cell controller 112 may be electronically synchronized such that under ideal conditions, when no delay has occurred, the cell controller record can be updated during the same time window as the part-processing processor 126 queries the cell controller 112. For example, the part-processing processor 126 can query the cell controller 112 for a predetermined time window such that if the cell controller record is updated at any time during the time window, the part-processing processor 126 may determine that an update as occurred. As shown in FIGS. 5A-5B, each time the inspection identifier of the cell controller record is updated during a time window, the part-processing control system record is similarly updated. In some cases, as will be explained in more detail with reference to FIG. 4, the cell controller processor 116 may determine that inspection has occurred during the pre-determined time window but may not receive inspection results until a later time. In such cases, the cell controller processor 116 may nevertheless update the cell controller record inspection identifier during the pre-determined time window to indicate that inspection has occurred and update the cell controller record at a later time, when the inspection results are received.

When the cell controller record fails to be updated prior to the part-processing processor 126 querying the cell controller 112, for example, if the part-processing operation or the inspection operation fails to be completed within the electronically timed time window, when the part-processing processor 126 queries the cell controller 112, the part-processing processor 126 may determine that no inspection has been completed and accordingly, the part-processing control system record may not be updated. In such cases, as the cell controller record is updated following completion of each part-processing operation and the part-processing control system record updated during predetermined electronically synchronized time windows, the cell controller record and the part-processing control system record may no longer be in agreement.

Similarly, if the connection between the part-processing control system 122 and the cell controller 112 is lost, the part-processing processor 126 may fail to obtain an updated inspection identifier from the cell controller 112. In such cases, updates to the cell controller record will not be recorded by the part-processing processor 126.

Referring to FIGS. 6A-6B in contrast to FIGS. 5A-5B, during time window 1, the cell controller record is not updated. The cell controller record may fail to be updated during the predetermined window if inspection is not completed on time. When the part-processing processor 126 queries the cell controller 112, the part-processing processor 126 can identify that no inspection has been made and the part-processing control system record may accordingly not be updated. The cell controller record can be updated however when inspection is completed, during time window 2.

At time window 3, the cell controller processor 116 increments the cell controller record inspection identifier in response to determining that another inspection event has occurred, as scheduled. When the part-processing processor 126 queries the cell controller 112, the part-processing processor 126 determines that the inspection identifier of the cell controller record has been updated, and updates the part-processing control system record. However, when querying the cell controller 112, as the part-processing processor 126 may only receive an indication that the expected inspection has occurred, the part-processing control system 122 may only determine that the latest inspection has occurred. Accordingly, the inspection identifier of the part-processing control system 122 will only be incremented by 1 and the cell controller and part-processing control system records will no longer be agreement.

Although FIGS. 5A-5B and FIGS. 6A-6B show inspections occurring at multiple consecutive time windows, it will be understood that inspections may be separated by one or more time windows.

In some embodiments when the cell controller processor 116 updates the inspection identifier of the cell controller record, the cell controller processor 116 may notify the part-processing control system 122. In some cases, notifying the part-processing control system 122 can involve incrementing the inspection identifier of the cell controller record.

In some embodiments, the part-processing processor 126 can transmit an inspection request to the cell controller 112 and the part-processing processor 126 may determine an expected inspection identifier for the workpiece. The inspection request can include the part identifier for the workpiece. The expected inspection identifier and the actual inspection identifier determined by the cell controller processor 116 may be compared and/or recorded in the cell controller record or the part-processing control system record.

At 312, upon completion of the part assembly task, the part-processing processor 126 compares the cell controller record and the part-processing control system record. The part-processing processor 126 can for example, query the cell controller for the cell controller record. For example, the part-processing processor 126 can query the cell controller record for the inspection identifier and compare the inspection identifier of the cell controller record with the inspection identifier of the part-processing control system 122. As the part-processing control system 122 is configured for rapid processing, during processing of a workpiece, the part-processing control system 122 may not have the resources or time to determine the state of each part-processing operation or the status of each workpiece. By comparing the part-processing control system and the cell controller records, the part-processing processor 126 can obtain information about the workpiece to determine its status.

In cases where the records are updated by incrementing inspection identifiers of the cell controller record and the part-processing control system record, the part-processing processor 126 can perform a numerical comparison of the inspection identifiers.

In some cases, prior to determining the status of the workpiece, the part-processing processor 126 can query the cell controller 112 for inspection results that have not previously been received by the part-processing control system 122. For example, as described with reference to 308, in some cases, during an inspection operation, the cell controller 112 may not receive inspection results within the electronically timed time window. In such cases, the inspection results may be collected by the cell controller 112, for example, recorded in the cell controller record, and transmitted to the part-processing control system 122 following completion of the part assembly task, prior to the determination of the status of the workpiece. For example, the inspection results may be transmitted during an electronically timed time window following completion of the part assembly task.

The cell controller record and part-processing control system record being in disagreement can indicate that at least one part-processing operation was not completed within the required time frame and/or was not completely satisfactorily within the required time frame. A part-processing operation which is not completed within the required time frame may in some cases, be an indication that the workpiece is defective and/or the part-processing device processing the workpiece is experiencing a fault that may cause a workpiece to become defective. By comparing the cell controller record and the part-processing control system records, the part-processing processor 126 can determine information about the workpiece that was not obtained during the part assembly task.

At 314, the part-processing processor 126 determines a status for the workpiece based on the comparison of 312. The status can be pass or fail the workpiece. For example, if the cell controller record and the part-processing control system record are in agreement—for example, the inspection identifiers of the two records are equal—part-processing processor 126 can pass the workpiece. Otherwise, part-processing processor 126 can fail the workpiece. A workpiece that is failed may be discarded as rejected scrap while a workpiece that is passed may proceed along the manufacturing line for further processing or be discharged as a finished product.

The part-processing processor 126 can then transmit the status determined at 314 to the cell controller 112 and the cell controller processor 116 can update the cell controller record with the status of the workpiece. The part-processing processor 126 may additionally transmit the part-processing control system record to the cell controller 112 and the cell controller processor 116 may merge the two records.

Alternatively, in some cases, upon completion of the part assembly task, the cell controller processor 116 can compare the cell controller record and the part-processing control system record. The part-processing processor 126 can for example, transmit the part-processing control system record to the cell controller 112 and the cell controller 112 can merge the cell controller record and the part-processing control system record to determine the status of the workpiece.

The cell controller processor 116 can transmit the merged record to database 150, for example, once the workpiece exits the cell. The cell controller record and the part-processing control system records may be cleared or discarded when the workpiece exists the cell and the data is transmitted to the external database 150.

Referring back to FIGS. 5A-5B, the part-processing processor 126 may compare the inspection identifiers during time window 49 and determine that the cell controller record and the part-processing control system inspection identifiers are in agreement and accordingly determine the status of the workpiece as "pass" as shown at 510b. The part-processing processor 126 may transmit the status to the cell controller 112, for example, during an electronically timed time window, as shown at 510b, such that the cell controller record is updated to reflect the status of the workpiece.

By contrast, referring back to FIGS. 6A-6B, the part-processing processor 126 may compare the inspection identifiers during time window 49 and determine that the cell controller record and the part-processing control system inspection identifiers differ and accordingly determine that the status of the workpiece as "fail" as shown at 610b. The part-processing processor 126 may transmit the status to the cell controller 112, for example, during an electronically timed time window, as shown at 610a, such that the cell controller record is updated to reflect the status of the workpiece.

In embodiments where the cell controller processor 116 can determine a status for the workpiece, the part-processing processor 126 may determine the status for the workpiece based at least in part on the status determined by the cell controller 112, such that the status of the workpiece may effectively be determined by the cell controller 112 or the part-processing control system 122.

In embodiments where the part-processing processor 126 determines an expected inspection identifier for the workpiece, the status for the workpiece can be based in part on the expected inspection identifier, for example, based on a comparison between the expected inspection identifier and the actual inspection identifier, that is, the part-processing processor 126 may determine the status for the workpiece based on a comparison of the final cell controller and the part-processing control system records or on intermediate results collected during the part assembly task as indicated within the part-processing control system record.

Referring to FIGS. 7A-7B which show example records, at time window 49, the part-processing processor 126 can query the cell controller 112 for the cell controller record. While the inspection identifiers may be in agreement, the part-processing processor 126 can receive an indication that an inspection failed during the processing of the workpiece, for example, that the workpiece did not pass inspection at time window 1 as shown at 720. The part-processing processor 126 can accordingly determine that the workpiece fails, as shown at 710b. Similar to FIGS. 6A-6B, the part-processing processor 126 can transmit the status to the cell controller 112, which can update the cell controller record, as shown at 710a.

In some embodiments, the cell controller processor 116 can then transmit the cell controller record to an external database. As the cell controller record is a detailed record for the workpiece, the record may be used for analysis of the processes performed by the cell.

Figure 4:
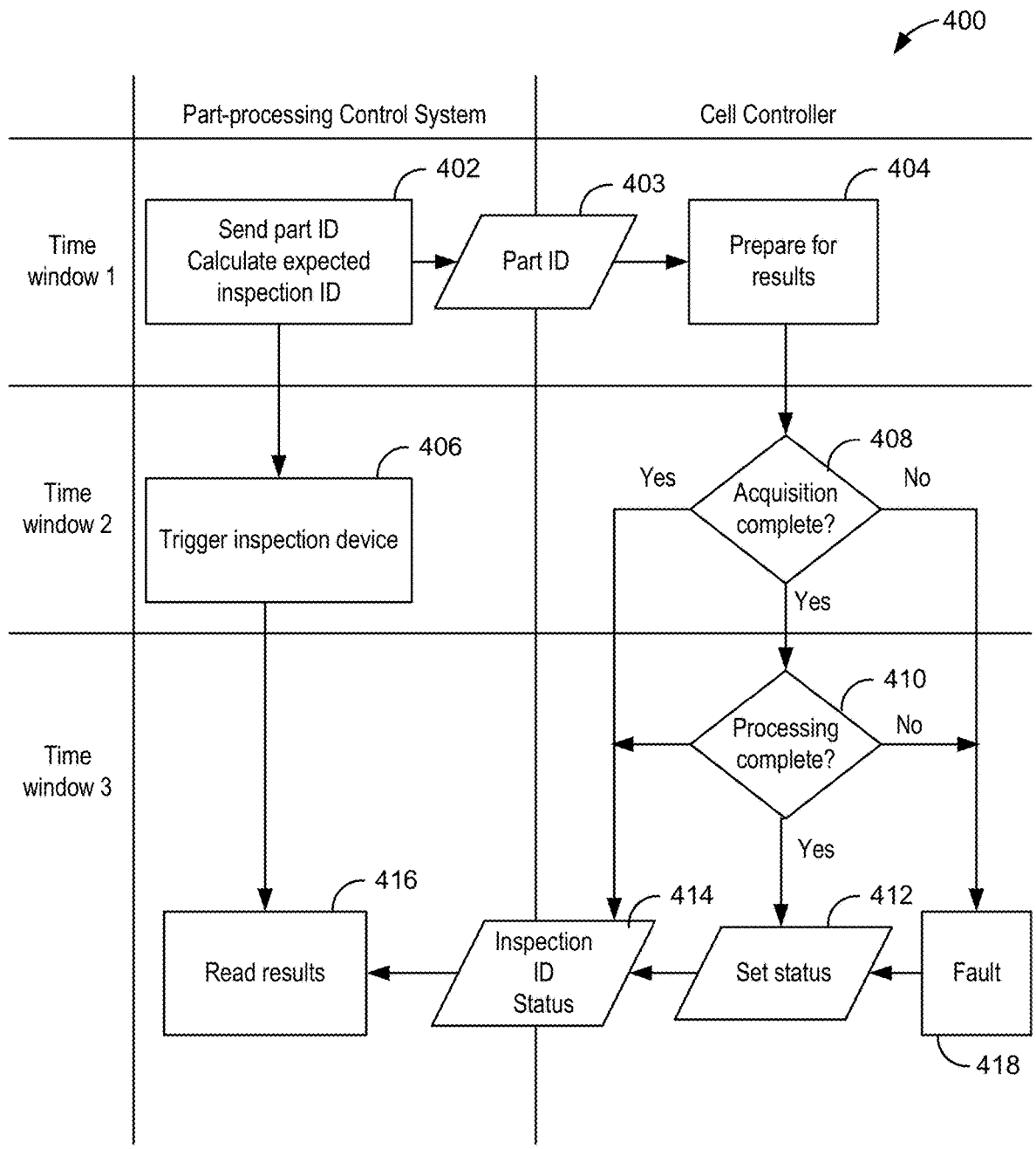
FIG. 4 is a flowchart of another example method for maintaining a record for a workpiece processed by a computer numerically controlled electronically synchronized manufacturing assembly line system.

Reference is now made to FIG. 4, which shows a flowchart of an example method 400 for maintaining a record for a workpiece processed by a computer numerically controlled electronically synchronized manufacturing assembly line system. Method 400 can correspond to an example implementation of steps 308 and 310 of method 300 where inspection results are obtained from an inspection device (not shown). While flowchart 400 is divided into three time windows, it is possible that some steps may be executed over more than one time window and/or that some steps may be executed during a different time window than shown in FIG. 4.

At 402, during the first electronically timed time window, the part-processing processor 126 can transmit a part identifier 403 corresponding to the workpiece to the cell controller 112. As described, the cell controller 112 may oversee multiple part-processing devices and may be in communication with more than one part-processing control system 122. Accordingly, the part identifier 403 may be used to identify the workpiece for which inspection results are to be obtained, acquire results for the identified workpiece and/or set the status of the identified workpiece in the cell controller record. Optionally, the part-processing processor 126 can determine an expected inspection identifier for the workpiece, as described previously.

At 404, during the same first electronically timed time window, the cell controller 112 can prepare itself for receiving inspection results.

At 406, during the second electronically timed time window, the part-processing processor 126 can transmit signal(s) to instruct an inspection device to perform an inspection operation. While in FIG. 4, the part-processing processor 126 instructs the inspection device to perform the inspection, depending on the implementation of the cell and/or the record management system, the cell controller processor 116 may instruct the inspection device to perform the inspection operation.

At 408, during the second electronically timed time window, the cell controller processor 116 acquires inspection results from an inspection device. The inspection results can include an indication that inspection has been completed and/or qualitative and/or quantitative results and/or images associated with inspection. If inspection results are not obtained within the electronically timed time window, the cell controller processor 116 determines that a fault has occurred and records the fault at 418 during the next time window. Alternatively, the cell controller processor 116 can wait for the inspection results to be received, as described with reference to method 300 at 308. Once the inspection results are received, during the third time window, the cell controller processor 116 updates the inspection identifier of the cell controller record to indicate that inspection has been completed.

In some cases, the inspection results may require processing or may need to be assessed. In such cases, during the third electronically timed time window, at 410, the cell controller processor 116 can determine whether the processing of the inspection results has been completed within the allotted time window. If the results are not processed within the time window, the cell controller processor 116 can determine that a fault has occurred and records the fault at 318. In some cases, as described above with reference to 308, the cell controller processor 116 can instead collect the results of the processing outside of the time window, not indicate that a fault has occurred, and transmit the results to the part-processing control system 122 at the end of the part assembly task, before the part-processing processor 126 compares the records.

In some embodiments, the acquisition 408 and the processing 410 can instead be completed within the same electronically timed time window.

At 412, the cell controller processor 116 determines the status for the workpiece based on the processing performed at 410.

At 414, the cell controller processor 116 transmits the inspection identifier and/or the status of the workpiece.

At 416, the part-processing control system 122 receives the cell controller record inspection identifier.

During normal operation (i.e., no delay-causing fault) of the cell, the part-processing processor 126 reads the result transmitted by the cell controller 112 during the third electronically timed time window and the part-processing control system record and the cell controller record. Accordingly, the part-processing control system record and the cell controller record are updated during the same time window such that the records will be in agreement.

If, however, a delay occurs on the cell controller side, one or more steps may fail to occur during the allotted electronically timed time window such that when part-processing processor 126 queries the cell controller at 416 during the third electronically timed time window, no result may be available. Alternatively, in some cases, if the acquisition of inspection results 408 fails to be completed within the allotted time window, the cell controller processor 116 may determine that a fault has occurred, and when the part-processing processor 126 queries the cell controller at 416, the part-processing processor 126 may determine that the inspection identifier of the cell controller record has not been updated or has been updated to indicate a failure to inspect the workpiece. As the part-processing processor 126 may only query the cell controller during a timed time window, updates to the cell controller record that are made outside the time window may not be received by the part-processing control system.

It will be appreciated that numerous specific details are set forth in order to provide a thorough understanding of the example embodiments described herein. However, it will be understood by those of ordinary skill in the art that the embodiments described herein may be practiced without these specific details. In other instances, well-known methods, procedures and components have not been described in detail so as not to obscure the embodiments described herein. Furthermore, this description and the drawings are not to be considered as limiting the scope of the embodiments described herein in any way, but rather as merely describing the implementation of the various embodiments described herein.

The embodiments of the systems and methods described herein may be implemented in hardware or software, or a combination of both. These embodiments may be implemented in computer programs executing on programmable computers, each computer including at least one processor, a data storage system (including volatile memory or non-volatile memory or other data storage elements or a combination thereof), and at least one communication interface. For example and without limitation, the programmable computers (referred to below as computing devices) may be a server, network appliance, embedded device, computer expansion module, a personal computer, laptop, personal data assistant, cellular telephone, smart-phone device, tablet computer, a wireless device or any other computing device capable of being configured to carry out the methods described herein.

In some embodiments, the communication interface may be a network communication interface. In embodiments in which elements are combined, the communication interface may be a software communication interface, such as those for inter-process communication (IPC). In still other embodiments, there may be a combination of communication interfaces implemented as hardware, software, and combination thereof.

Program code may be applied to input data to perform the functions described herein and to generate output information. The output information is applied to one or more output devices, in known fashion.

Each program may be implemented in a high level procedural or object oriented programming and/or scripting language, or both, to communicate with a computer system. However, the programs may be implemented in assembly or machine language, if desired. In any case, the language may be a compiled or interpreted language. Each such computer program may be stored on a storage media or a device (e.g. ROM, magnetic disk, optical disc) readable by a general or special purpose programmable computer, for configuring and operating the computer when the storage media or device is read by the computer to perform the procedures described herein. Embodiments of the system may also be considered to be implemented as a non-transitory computer-readable storage medium, configured with a computer program, where the storage medium so configured causes a computer to operate in a specific and predefined manner to perform the functions described herein.

Furthermore, the system, processes and methods of the described embodiments are capable of being distributed in a computer program product comprising a computer readable medium that bears computer usable instructions for one or more processors. The medium may be provided in various forms, including one or more diskettes, compact disks, tapes, chips, wireline transmissions, satellite transmissions, internet transmission or downloadings, magnetic and electronic storage media, digital and analog signals, and the like. The computer useable instructions may also be in various forms, including compiled and non-compiled code.

Various embodiments have been described herein by way of example only. Various modification and variations may be made to these example embodiments without departing from the spirit and scope of the invention, which is limited only by the appended claims.

We claim:

1. A method for operating a dual-controller system for improving a rapid-speed manufacturing process at a computer numerically controlled (CNC) electronically synchronized cell of a manufacturing assembly line for a plurality of workpieces, the CNC electronically synchronized cell comprising a plurality of CNC-equipped workstations operating according to timed and coordinated motion, the method comprising:

operating a cell controller of the dual-controller system to, in real-time, generate and manage, a cell controller record for a workpiece of the plurality of workpieces during the rapid-speed manufacturing process, the cell controller being responsible for overseeing the rapid-speed manufacturing process at the CNC electronically synchronized cell;

operating a part-processing controller of the dual-controller system to, in real-time, generate and manage a part-processing controller record for the workpiece during the rapid-speed manufacturing process, the part-processing controller being responsible for motion control at the plurality of CNC-equipped workstations, the part-processing controller operating to manage the part-processing controller record to include processing information related to the workpiece during one or more part assembly tasks in real-time, and the cell controller operating to manage the cell controller record which comprises workpiece data in addition to the part-processing controller record;

initiating by the cell controller the rapid-speed manufacturing process at the CNC electronically synchronized cell during which at least one part assembly task is initiated, the at least one part assembly task comprises at least one electronically synchronized part-processing operation involving motion control managed by the part-processing controller within one or more predefined timed windows;

during the rapid-speed manufacturing process and upon completion of each electronically synchronized part-processing operation of the at least one electronically synchronized part-processing operation, operating the cell controller to, in real-time during the rapid-speed manufacturing process, modify the cell controller record to include an inspection identifier based on a result of the at least one part-processing operation; and at a predefined time window of the one or more predefined timed windows following completion of the part assembly task managed by the part-processing controller, operating the part-processing controller to initiate a status request for the result of the at least one part-processing operation and modifying the part-processing controller record based on the received result from the cell controller;

during the rapid-speed manufacturing process and upon completion of the part assembly task, operating the part-processing controller to evaluate the cell controller record and the part-processing controller record to assign a status for the workpiece following the part assembly task consistent with the rapid-speed manufacturing process.

2. The method of claim 1, wherein the method further comprises:

determining, at the cell controller, a reference identifier for the workpiece; and transmitting, at the cell controller, a part identifier based on the reference identifier to the part-processing controller, wherein generating the cell controller record comprises initializing the cell controller record based on the reference identifier for the workpiece, and wherein generating the part-processing controller record comprises initializing the part-processing controller record based on the part identifier for the workpiece.

3. The method of claim 2, wherein the part identifier comprises a portion of the reference identifier.

4. The method of claim 2, wherein initiating the at least one part assembly task comprises determining the part assembly task based on the reference identifier.

5. The method of claim 2, wherein the method further comprises:

notifying, at the part-processing controller, the cell controller of a presence of the workpiece in the cell;

transmitting, at the cell controller, instructions to an identification device in communication with the cell controller for identifying the workpiece; and determining the reference identifier based on a result of the identification device.

6. The method of claim 1, wherein modifying the cell controller record comprises incrementing an inspection identifier of the cell controller record and wherein modifying the part-processing controller record comprises incrementing an inspection identifier of the part-processing controller record.

7. The method of claim 1, wherein the method further comprises: querying the cell controller at an electronically timed time interval and determining the presence of the modified inspection identifier during the electronically timed time interval.

8. The method of claim 7, wherein the electronically timed time interval is based on the at least one electronically synchronized part-processing operation.

9. The method of claim 1, wherein the method further comprises:

notifying, at the cell controller, of a presence of the updated inspection identifier to the part-processing controller.

10. The method of claim 1, wherein the method further comprises:

transmitting, at the part-processing controller, the part-processing controller record to the cell controller; and merging, at the cell controller, the cell controller record and the part-processing controller record to obtain a merged cell controller record.

11. The method of claim 10, wherein the method further comprises transmitting the merged cell controller record to a database.

12. The method of claim 1, wherein the method further comprises: comparing the inspection identifier of the cell controller record and the inspection identifier of the part-processing controller.

13. The method of claim 1, wherein the part assembly task comprises at least one loading operation and wherein the method further comprises:

transmitting, by the part-processing controller, a request identifier associated with the workpiece, the request identifier comprising a pallet identifier and a nest identifier for the workpiece associated with a station within the cell; and updating, at the cell controller, the cell controller record with a location identifier of the workpiece associated with the station.

14. The method of claim 2, wherein the method further comprises:

transmitting, to at least one part-processing device, process information for processing the workpiece based on the reference identifier and a location identifier for the workpiece; and processing, by the at least one part-processing device, the workpiece according to the process information.

15. The method of claim 2, wherein the method further comprises:

transmitting, at the part-processing controller, an inspection request to the cell controller, the inspection request comprising the part identifier for the workpiece; and determining, at the part-processing controller, an expected inspection identifier for the workpiece, and wherein determining, at the part-processing controller, the status for the workpiece is based in part on the expected inspection identifier for the workpiece.

16. The method of claim 14, wherein the method further comprises:

receiving, by the cell controller, an inspection result for the workpiece from a part-processing device of the at least one part-processing device;

updating, by the cell controller, the cell controller record for the workpiece with the inspection result;

determining, by the cell controller, the status for the workpiece based on the inspection result; and updating the cell controller record with at least one of the inspection result and the status for the workpiece.

17. The method of claim 16, wherein determining the status for the workpiece is assigned by evaluating the inspection result based on process tolerances.

18. The method of claim 17, wherein the process tolerances are based on at least one of the reference identifier for the workpiece and the part-processing device.

19. The method of claim 1, wherein the status of the workpiece is one of a pass or a fail.

20. A dual-controller system for improving a rapid-speed manufacturing process at a computer numerically controlled (CNC) electronically synchronized cell of a manufacturing assembly line for a plurality of workpieces, the CNC electronically synchronized cell comprising a plurality of CNC-equipped workstations operating according to timed and coordinated motion, the dual-controller system comprising:

a cell controller of the dual-controller system configured to:

generate and manage, in real-time, a cell controller record for a workpiece of the plurality of workpieces during the rapid-speed manufacturing process, the cell controller being responsible for overseeing the rapid-speed manufacturing process at the CNC electronically synchronized cell;

initiate the rapid-speed manufacturing process at the CNC electronically synchronized cell during which at least one part assembly task is initiated, the at least one part assembly task comprises at least one electronically synchronized part-processing operation involving motion control managed by a part-processing controller of the dual-controller system within one or more predefined time windows; and during the rapid-speed manufacturing process and upon completion of each electronically synchronized part-processing operation of the at least one electronically synchronized part-processing operation, modify the cell controller record to include an inspection identifier based on a result of the at least one electronically synchronized part-processing operation; and the part-processing controller electronically synchronized with the cell controller and being responsible for motion control at the plurality of CNC-equipped workstations, the part-processing controller being configured to:

generate and manage, in real-time, a part-processing controller record for the workpiece during the rapid-speed manufacturing process, the part-processing controller record including processing information related to the workpiece during one or more part assembly tasks in real-time, and the cell controller record comprising workpiece data in addition to the part-processing controller record;

during the rapid-speed manufacturing process and upon completion of each electronically synchronized part-processing operation of the at least one electronically synchronized part-processing operation, at a predefined time window of the one or more predefined timed windows following completion of the part assembly task, initiate a status request for the result of the at least one part-processing operation and modify the part-processing controller record based on the received result from the cell controller; and during the rapid-speed manufacturing process and upon completion of the part assembly task, evaluate the cell controller record and the part-processing controller record to assign a status for the workpiece following the part assembly task consistent with the rapid-speed manufacturing process.

21. The dual-controller system of claim 20, wherein the cell controller is further configured to:

determine a reference identifier for the workpiece;

transmit a part identifier based on the reference identifier to the part-processing controller; and generate the cell controller record based on the reference identifier for the workpiece, and wherein the part-processing controller is further configured to generate the part-processing controller record based on the part identifier for the workpiece.

22. The dual-controller system of claim 21, wherein the part identifier comprises a portion of the reference identifier.

23. The dual-controller system of claim 21, wherein initiating the at least one part assembly task comprises determining the part assembly task based on the reference identifier.

24. The dual-controller system of claim 21, wherein:

the part-processing controller is configured to notify the cell controller of a presence of the workpiece in the cell; and wherein the cell controller is configured to:

transmit instructions to an identification device in communication with the cell controller for identifying the workpiece; and determine the reference identifier based on a result of the identification device.

25. The dual-controller system of claim 20, wherein modifying the cell controller record comprises incrementing an inspection identifier of the cell controller record and wherein modifying the part-processing controller record comprises incrementing an inspection identifier of the part-processing controller record.

26. The dual-controller system of claim 20, wherein the part-processing controller is configured to:
   query the cell controller at an electronically timed time interval; and
   determine the presence of the updated inspection identifier during the electronically timed time interval.

27. The dual-controller system of claim 26, wherein the electronically timed time interval is based on the at least one electronically synchronized part-processing operation.

28. The dual-controller system of claim 20, wherein the cell controller is configured to notify the part-processing controller of a presence of the updated inspection identifier.

29. The dual-controller system of claim 20, wherein the part-processing controller is further configured to transmit the part-processing controller record to the cell controller and wherein the cell controller is further configured to merge the cell controller record with part-processing controller record to obtain a merged cell controller record.

30. The dual-controller system of claim 29, wherein the cell controller is configured to transmit the merged cell controller record to a database.

31. The dual-controller system of claim 20, wherein the part-processing controller is configured to compare the inspection identifier of the cell controller record and the inspection identifier of the part-processing controller.

32. The dual-controller system of claim 20, wherein the part assembly task comprises at least one loading operation and wherein the part-processing controller is configured to transmit a request identifier associated with the workpiece, the request identifier comprising a pallet identifier and a nest identifier for the workpiece associated with a station within the cell and wherein the cell controller is configured to update the cell controller record with a location identifier of the workpiece associated with the station.

33. The dual-controller system of claim 21, wherein the part-processing controller is configured to:
   transmit, to at least one part-processing device, process information for processing the workpiece based on the reference identifier and a location identifier for the workpiece; and
   process, by the at least one part-processing device, the workpiece according to the process information.

34. The dual-controller system of claim 21, wherein the part-processing controller is configured to:
   transmit an inspection request to the cell controller, the inspection request comprising the part identifier for the workpiece; and
   determine an expected inspection identifier for the workpiece, and
   wherein determining the status for the workpiece is based in part on the expected inspection identifier for the workpiece.

35. The dual-controller system of claim 33, wherein the cell controller is configured to:
   receive an inspection result for the workpiece from a part-processing device of the at least one part-processing device;
   update the cell controller record for the workpiece with the inspection result;
   determine the status for the workpiece based on the inspection result; and
   update the cell controller record with at least one of the inspection result and the status for the workpiece.

36. The dual-controller system of claim 35, wherein determining the status for the workpiece comprises evaluating the inspection result based on process tolerances.

37. The dual-controller system of claim 36, wherein the process tolerances are based on at least one of the reference identifier for the workpiece and the part-processing device.

38. The dual-controller system of claim 20 wherein the status of the workpiece is one of a pass or a fail.

* * * * *